United States Patent
Sekiya

(10) Patent No.: US 8,078,115 B2
(45) Date of Patent: Dec. 13, 2011

(54) RADIO NETWORK PERFORMANCE MONITORING METHOD, RADIO COMMUNICATION SYSTEM, DEVICE, AND ITS PROGRAM

(75) Inventor: Kayato Sekiya, Tokyo (JP)

(73) Assignee: NEC Corporation, Tokyo (JP)

( * ) Notice: Subject to any disclaimer, the term of this patent is extended or adjusted under 35 U.S.C. 154(b) by 376 days.

(21) Appl. No.: 12/517,963

(22) PCT Filed: Nov. 28, 2007

(86) PCT No.: PCT/JP2007/072896
§ 371 (c)(1),
(2), (4) Date: Jun. 5, 2009

(87) PCT Pub. No.: WO2008/069058
PCT Pub. Date: Jun. 12, 2008

(65) Prior Publication Data
US 2011/0003554 A1    Jan. 6, 2011

(30) Foreign Application Priority Data
Dec. 8, 2006   (JP) .................................. 2006-331737

(51) Int. Cl.
*H04B 17/00* (2006.01)

(52) U.S. Cl. ............... 455/67.11; 455/67.13; 455/114.2; 455/115.1; 455/154.1; 455/135

(58) Field of Classification Search ............... 455/67.11, 455/67.13, 67.16, 114.2, 115.1, 115.3, 135, 455/154.1, 161.3, 437, 442, 436, 552.1; 370/331, 370/332, 335, 342, 252, 254, 248, 249, 250
See application file for complete search history.

(56) References Cited

U.S. PATENT DOCUMENTS

| | | | |
|---|---|---|---|
| 5,737,314 A * | 4/1998 | Hatono et al. | 370/235 |
| 6,701,130 B1 * | 3/2004 | Hamalainen et al. | 455/67.11 |
| 7,016,320 B1 * | 3/2006 | Petersson et al. | 370/331 |
| 2003/0137942 A1 * | 7/2003 | Ladegaard | 370/252 |
| 2005/0239498 A1 * | 10/2005 | Dorenbosch et al. | 455/552.1 |

FOREIGN PATENT DOCUMENTS

| | | |
|---|---|---|
| JP | 1996008802 A | 1/1996 |
| JP | 2910980 B | 4/1999 |
| JP | 2003528492 A | 9/2003 |
| JP | 2004242259 A | 8/2004 |

OTHER PUBLICATIONS

International Search Report for PCT/JP2007/072896 mailed Mar. 4, 2008.
"Performance measurements—UMTS and combined UMTS/GSM(TS32.403) V4.10.0", 3GPP, Mar. 2005, p. 21.
"UTRAN Iu interface Radio Access Network Application Part (PANAP) signaling (TS 25.413) V3.14.0", 3GPP, Sep. 2003, p. 23, 60, 83-90.

* cited by examiner

*Primary Examiner* — Tan Trinh

(57) ABSTRACT

During a communication, the radio connection quality is measured so as to detect and store a generation time, an end time, and a continuation time of quality degradation. Upon a communication end, the end cause is judged. If the communication end is caused by a user operation, a causal connection between the communication end and the quality degradation is judged according to temporal relationship between the generation time of the quality degradation and the communication end time. That is, it is judged whether the communication end caused by the user operation is a phenomenon that the user has terminated the communication because of the communication quality degradation or other reason. Thus the communication end reasons are divided into at least two types and accumulated.

21 Claims, 8 Drawing Sheets

RADIO NETWORK PERFORMANCE MONITORING METHOD, RADIO COMMUNICATION SYSTEM, DEVICE, AND ITS PROGRAM

The present application is the National Phase of PCT/JP2007/072896, filed Nov. 28, 2007, which claims the priority right based on Japanese Patent application No. 2006-331737 filed on Dec. 8, 2006 and the entire of the disclosure is incorporated here.

TECHNICAL FIELD

The present invention relates to a radio network performance monitoring method in radio communication systems, a radio communication system, a radio communication terminal, a radio base station controller, and a radio network performance monitoring program. Particularly, the present invention relates to a radio network performance monitoring method, a radio communication system, a radio communication terminal, a radio base station controller, and a radio network performance monitoring program, each for monitoring the performance of a radio network that detects the phenomenon that a user has terminated communications voluntarily due to deterioration of communication quality.

BACKGROUND OF THE RELATED ART

In radio communication systems such as mobile communication systems, plural base stations, each which establishes a relay between a radio link and a cable link, are installed and the radio wave service areas provided by them are overlapped. That feature provides a communication service enabling communications between mobile stations existing in a broad physical area other mobile stations. If the quality of radio waves transmitted from a mobile station is not sufficient in the place where a mobile station exists, the communication quality will be deteriorated. In some situations, such quality deterioration may cause out-of-synchronization between a base station and a mobile station, thus resulting in abnormal disconnection of the radio link. Communication troubles, such as abnormal disconnection, largely deteriorate conveniences to users and discomfort users, thus finally leading to cancellation of service contracts. Therefore, the network performance monitoring process that monitors the frequency of occurrence of abnormal disconnection is now essential to communication carriers.

Non-patent document 1 discloses the performance monitoring items in the third generation UMTS (Universal Mobile Telecommunications System) standardized in the 3GPP (third generation Partnership Project). In the section 4.2 of non-patent document 1, the method is disclosed for accumulating and recording the number of times of release for each release reason of radio access bearer (RAB). Section 9.2.1.4 of non-patent document 2 tabulates concrete release reasons. For example, by using accumulated values of "Radio connection with UE lost" shown as the release reason 46, you can grasp the number of times of abnormal communication termination due to disconnection of a radio link.

Non-patent document 1 discloses the method for measuring a bit error ratio of received signals in a communication channel, in a mobile station or base station; generating alarm that informs a user of the detection when the bit error ratio of a predetermined value or more is detected continuously a predetermined number of times; and forcibly disconnecting the communication channel when the alarm continues an elapsed time.

Patent document: Patent publication No. 2910980 (FIG. 1, Page 4)

Non-patent document 1: "Performance measurements-UMTS and combined UMTS/GSM(TS32.403) V4.10.0", 3GPP, March in 2005, pp.

Non-patent document 2: "UTRAN Iu interface Radio Access Network Application Part (PANAP) signaling (TS 25.413) V3.14.0", 3GPP, September in 2003, pp. 23, 60, 83-90

DISCLOSURE OF THE INVENTION

Problems to be Solved by the Invention

Many users of the world recognize that the communication quality may be deteriorated due to radio wave conditions in radio communications. In most cases, when feeling a sign of an abnormal termination such as speech break, the user terminates the communication through his operation. Then, he tries redialing after moving into an area in better radio wave conditions.

However, in the prior art, the problem is that the phenomenon that a user has terminated communications voluntarily due to deterioration of communication quality cannot be figured out quantitatively.

In the methods disclosed in the non-patent documents 1 and 2, when a user, for example, feels deterioration of communication quality and terminates or ends communication voluntarily for re-dialing, the termination is recognized as "Release due to UE generated signaling connection release" of release reason No. 40. For that reason, the termination cannot be distinguished from the phenomenon that a user has completed communications independently of deterioration of communication quality.

Similarly, in the method of non-patent document 1, the system side detects deterioration of communication quality and can control the termination of calls according to the detection condition. However, the prior art system is not provided with means that detects the phenomenon that a user has terminated communications voluntarily for re-dialing before the communication channel is forcibly disconnected after passing a constant period of time of an alarm issuing condition.

Communication termination or re-dialing performed by a user due to deterioration of communication quality leads to loosing user friendliness and such inconvenience may give communication carriers the unfavorable impression, in the same way as the case with abnormal communication termination due to disconnection of radio communication. Therefore, in addition to grasping the number of times of abnormal communication termination due to radio link disconnection, taking suitable measures, such as quantitatively grasping the phenomenon that a user terminates communications voluntarily due to deterioration of communication quality or increasing the number of base stations, is indispensable for an improvement of service quality.

An object of the present invention is to provide a radio network performance monitoring method, a radio communication system, a radio communication terminal, a radio bases station controller, and a radio network monitoring program, each which can grasp quantitatively the phenomenon that a user has terminated voluntarily communications due to degradation of communication quality. Furthermore, the present invention aims at assisting a suitable handling such as extension of base stations and an improvement of service quality, according to the phenomenon that a user terminates communications voluntarily due to the deterioration of communication quality grasped quantitatively.

Means to Solve the Problems

According to the present invention, a method for monitoring the communication performance of a radio communication network, comprises the steps of measuring the quality of a radio connection while a radio communication terminal of a user is during communication; deciding the presence or absence of a quality deterioration based on measured values of the quality; deciding whether or not termination has caused by an operation of the user at a communication termination time and deciding whether or not the termination is a voluntary communication termination by a user due to quality deterioration of communication, using deterioration information based on decision results of the presence or absence of the quality deterioration, when the termination has caused by the user's operation; and summarizing the number of occurrences of the phenomenon occurs that the user terminates communications voluntarily due to quality deterioration of communication.

The radio network performance monitoring method further comprises the steps of detecting and storing a quality deterioration occurrence time based on decision results on the presence or absence of quality deterioration during communication of a radio communication terminal detecting a termination time of communication at an end of communication; and deciding that the termination is a voluntary communication termination by a user due to quality deterioration of communication when communication termination has caused by a user's operation while a time interval between an occurrence time of the quality deterioration and a termination time of the communications is less than a predetermined value.

The radio network performance monitoring method further comprises the step of detecting, as radio connection quality information, at least one of a desired wave received power of a common pilot channel, a ratio of energy to in-band received power density, a block error ratio of a transport block, and a transmission power control state based on transmission power of a individual channel and based on a transmission power control field value; and thus measuring a radio connection quality.

The radio network performance monitoring method further comprises the step of monitoring at least one of a user's button operation and transmission of a call control message for call control; and thus deciding whether or not communication has been terminated due to user's operation.

The radio network performance monitoring method further comprises the steps of calculating a difference between an occurrence time of quality deterioration and a communication termination time when communication termination has caused by a user's operation; and thus deciding that the termination is a voluntary communication termination by a user due to quality deterioration of communication, when the resultant difference is less than a predetermined threshold value.

The radio network performance monitoring method further comprises the step of deciding that the termination is a voluntary communication termination by user due to quality deterioration of communication, when communication termination is caused by a user's operation while a difference between an occurrence time of quality deterioration and a communication termination time is less than a predetermined threshold value and a duration of quality deterioration is the predetermined time or more.

The radio network performance monitoring method further comprises the steps of storing a communication destination identifier, which identifies a communication opposite party, when decision indicates that a user has terminated communications voluntarily due to communication quality deterioration; deciding whether or not re-dialing to the same communication opposite party has been made based on a communication destination identifier in a current communication and a communication destination identifier stored in the previous communication at the next communication time; and summarizing the number of occurrences of re-dialing due to communication quality deterioration.

The radio network performance monitoring method comprises the steps of storing a communication destination identifier, a quality measured value in communication termination, and a communication termination time; and deciding that the current communication corresponds to re-dialing due to communication quality deterioration when, to the same communication opposite party, the quality at the beginning of the current communication is improved more than a predetermined value, compared with the quality at the end of the previous communication, and when an elapsed time between the termination of the previous communication and the beginning of the current communication is within a predetermined duration.

According to the present invention, a radio communication system for providing a communication service to a radio communication terminal operated by a user, comprises a quality measuring unit for measuring a radio connection quality during communication of a radio communication terminal; a deterioration information detector for deciding the presence or absence of quality deterioration based on information indicating qualities measured by said quality measuring unit and detecting deterioration information based on decision results on the presence or absence of the quality deterioration; a call state detector for detecting the beginning and termination of communication of the radio communication terminal or a cause of termination indicating whether or not termination has occurred due to a user's operation; a termination cause decision unit for deciding a termination cause detected by the call state detector in communication termination and deciding whether or not the communication termination is a voluntary communication termination by a user due to communication quality deterioration, using deterioration information detected by the deterioration information detector when the termination has occurred due to a user's operation; and a summation unit for summarizing the number of occurrences of voluntary communication termination by a user due to communication quality deterioration, based on decision results by the causal relation decision unit.

A radio communication system comprises a radio communication terminal (for example, radio mobile stations 1-1 to 1-5) operated by a user; and a radio network controller (for example, the radio network management server 7) connected to the radio communication terminal via a radio communication network. The radio communication terminal includes a quality measuring unit (for example, the quality measuring unit 11) for measuring a radio connection quality during communication of the radio communication terminal; a deterioration information detector (for example, the processing unit 13) for deciding the presence or absence of quality deterioration based on information indicating the quality measured by the quality measuring unit and detecting deterioration information based on decision results of the presence or absence of the quality deterioration; a call state detector (for example, the call state detector 12) for detecting the beginning and termination of communication of a radio communication terminal or a termination cause indicating whether or not termination has occurred due to a user's operation; a termination cause decision unit (for example, the processing unit 13) deciding a cause of termination detected by the call state detector in communication termination and deciding whether or not the termination is a voluntary communication termination by a user due to quality deterioration of communication, using deterioration information detected by the deterioration information detector when termination has occurred due to a user's operation; and a counter unit (for example, the processing unit 13) for counting the number of occurrences of voluntary communication termination by a user due to communication quality deterioration based on decision results by the causal relation decision unit. The radio network controller includes a summation display unit for summarizing and displaying the number of occurrences of voluntary communication termination by user due to communication quality deterioration in each radio communication terminal.

The radio communication terminal comprises a communication destination detector (for example, the call destination decision unit 15) for detecting a communication destination identifier that identifies a communication opposite party. The counter unit stores said communication destination identifier into a storage unit when decision indicates that the termination is a voluntary communication termination by a user due to communication quality deterioration. The counter unit also decides whether or not re-dialing has been performed to the same communication opposite party in the next communication, based on a communication destination identifier in a current communication and based on a communication destination identifier stored in the previous communication, and counts the number of occurrences of re-dialing due to communication quality deterioration. The summation display unit summarizes and displays the number of occurrences of re-dialing due to communication quality deterioration of each radio communication terminal.

A radio communication system comprises a radio communication terminal operated by a user; a radio base station controller (for example, the radio base station controllers 4-1 to 4-2) for controlling a radio base station for establishing a bi-directional radio link to the radio communication terminal and a radio network management unit at least connected to the radio base station controller via a radio communication network. The radio base station controller includes a quality measuring unit for measuring a radio connection quality of the radio communication terminal during communication of the radio communication terminal belonging to the radio station to be controlled; a deterioration information detector for deciding the presence or absence of quality deterioration based on information indicating the quality measured by the quality measuring unit and detecting deterioration information based on decision results on the presence or absence of the quality deterioration; a call state detector for detecting the beginning and termination of communication of a radio communication terminal or a termination cause indicating whether or not termination has occurred due to a user's operation; a termination cause decision unit for deciding a termination cause of communication detected by the call state detector in communication termination of the radio communication terminal and deciding whether or not the termination is a voluntary communication termination by a user due to communication quality deterioration, using deterioration information detected by the deterioration information detector when the termination has occurred due to a user's operation; and a counter for counting the number of occurrences of voluntary communication termination by a user due to quality deterioration of communication based on decision results by the causal relation decision unit. The radio network controller includes a summation display unit for summarizing and displaying the number of occurrences of voluntary communication termination by user due to communication quality deterioration in each radio communication terminal counted by the radio base station controller.

The radio base station controller comprises a communication destination detector that detects a communication destination identifier for identifying a communication opposite party of a radio communication terminal belonging to the radio base station to be controlled. The counter stores the communication destination identifier into a storage unit when decision indicates that termination of the radio communication terminal is communication termination by a user due to communication quality deterioration. The counter also decides whether or not re-dialing has been performed to the same communication opposite party in the next communication of the radio communication terminal, based on a communication destination identifier in current communication and based on a communication destination identifier stored in previous communication, and counts the number of occurrences of re-dialing due to communication quality deterioration. The summation display unit summarizes and displays the number of occurrences of re-dialing due to communication quality deterioration of each radio communication terminal.

According to the present invention, a radio communication terminal in a radio communication system, which is operated by a user, comprises a quality measuring unit for measuring a radio connection quality of the radio communication terminal during communication of the radio communication terminal; a deterioration information detector for deciding the presence or absence of quality deterioration based on information indicating the quality measured by the quality measuring unit and detecting deterioration information based on decision results on the presence or absence of the quality deterioration; a call state detector for detecting the beginning and termination of communication of a radio communication terminal or a termination cause indicating the presence or absence of termination caused by a user's operation; a termination cause decision unit for deciding a termination cause of communication detected by the call state detector in communication termination and deciding whether or not termination is a voluntary communication termination by a user due to communication quality deterioration, using deterioration information detected by the deterioration information detector when termination has occurred due to a user's operation; and a counter for counting the number of occurrences of voluntary communication termination by a user due to communication quality deterioration based on decision results by the causal relation decision unit.

The radio communication terminal further comprises a communication destination detector that detects a communication destination identifier for identifying a communication opposite party. The counter stores the communication destination identifier into a storage unit when decision indicates that termination is voluntary communication termination by a user due to communication quality deterioration. The counter also decides whether or not re-dialing has been performed to the same communication opposite party in the next communication, based on a communication destination identifier in current communication and based on a communication destination identifier stored in the previous communication and counts the number of occurrences of re-dialing due to quality deterioration of communication.

According to the present invention, a radio control base station for controlling a radio base station that establishes a bi-directional radio link to a radio communication terminal operated by a user in a radio communication system, comprises a call state detector for detecting the beginning and termination of communication of a radio communication terminal belonging to a radio base station to be controlled or a termination cause indicating whether or not termination has occurred a user's operation; a quality measuring unit for measuring a radio connection quality in the radio communication terminal during communication of the radio communication terminal; a deterioration information detector for deciding the presence or absence of quality deterioration based on information indicating the quality measured by the quality measuring unit and detecting deterioration information based on decision results on the presence or absence of the quality deterioration; a termination cause decision unit for deciding a termination of communication detected by the call state detector in communication termination of the radio communication terminal and deciding whether or not termination is voluntary communication termination by a user due to communication quality deterioration, using deterioration information detected by the deterioration information detector when termination has occurred due to a user's operation; and a counter for counting the number of occurrences of voluntary communication termination by a user due to communication quality deterioration based on decision results by the causal relation decision unit.

The radio base station controller further comprises a communication destination detector that detects a communication destination identifier for identifying a communication opposite party of a radio communication terminal. The counter stores the communication destination identifier into a storage unit when decision indicates that termination of the radio communication terminal is a voluntary communication terminal by a user due to communication quality deterioration. The counter also decides whether or not re-dialing has been performed to the same communication opposite party in the next communication of the radio communication terminal, based on a communication destination identifier in the current communication and based on a communication destination identifier stored in the previous communication.

According to the present invention, a radio network performance monitoring program suitably applied to a radio communication terminal operated by a user in a radio communication system, directs a computer to execute the steps of detecting the beginning and termination of communication or a termination cause indicating whether or not termination has occurred due to a user's operation; measuring a radio connection quality during communication; deciding the presence or absence of the quality deterioration based on information indicating a measured quality and detecting deterioration information based on the decision results on the presence or absence of the quality deterioration; deciding the cause of termination in communication termination and deciding whether or not the termination is a voluntary communication termination by a user due to communication quality deterioration, using the deterioration information when the termination is caused by a user's operation; and counting the number of occurrences of termination performed voluntarily by a user due to communication quality deterioration.

Moreover, the radio network performance monitoring program further executes a computer to execute the steps of storing the communication destination identifier into a storage unit when it is decided that termination has been performed voluntarily by a user due to communication quality deterioration; and deciding whether or not re-dialing has been performed to the same communication opposite party in the next communication, based on a communication destination identifier in the current communication and based on a communication destination identifier stored in the previous communication, and counting the number of occurrences of re-dialing due to communication quality deterioration.

Moreover, a radio network performance monitoring program suitably applied to a radio base station controller that controls a radio base station establishing a bi-directional radio link to a radio communication terminal operated by a user in a radio communication system, directs a computer to execute the steps of detecting the beginning and termination of communication of a radio communication terminal belonging to a radio base station to be controlled or a termination cause indicating whether or not termination has caused by a user's operation; measuring a radio connection quality of the radio communication terminal during communication of the radio communication terminal; deciding the presence or absence of the quality deterioration based on information indicating quality and detecting deterioration information based on the decision results on the presence or absence of the quality deterioration; deciding the cause of termination in communication termination of the radio communication terminal and deciding whether or not termination is a voluntary communication termination by a user due to communication quality deterioration, using the deterioration information when the termination has caused by a user's operation; and counting the number of occurrences of termination performed voluntarily by a user due to communication quality deterioration.

Moreover, the radio network performance monitoring program further directs a computer to execute the steps of storing the communication destination identifier into a storage unit when it is decided that termination of a radio communication terminal has been performed voluntarily by a user due to communication quality deterioration; and deciding whether or not re-dialing has been performed to the same communication opposite party in the next communication of the radio communication terminal, based on a communication destination identifier in the current communication and based on a communication destination identifier stored in the previous communication, and counting the number of occurrences of re-dialing due to communication quality deterioration.

Effect of the Invention

The first effect of the present invention is that the phenomenon that a user has terminated communications voluntarily due to deterioration of communication quality can be grasped quantitatively. The reason is that whether or not a communication termination has caused by a user's operation is decided and that if the termination is due to a user's operation, a causal relation between the termination and the deterioration of communication quality is further decided.

The second effect is that resuming (re-dialing) after a user has once interrupted communications voluntarily due to deterioration of communication quality can be grasped quantitatively. The reason is that a communication destination identifier is stored in the communication termination by a user's operation due to deterioration of communication quality and that a causal relation between bi-directional communications is decided based on communication destinations, for example, in the next communication.

In either case, the present invention can accurately grasp the complicated action that a user is forced due to incomplete maintenance of a network. Accordingly, the present invention can assist a suitable dealing such as expansion of base stations and an improvement of service quality.

EXPLANATION OF SYMBOLS

Figure 1:
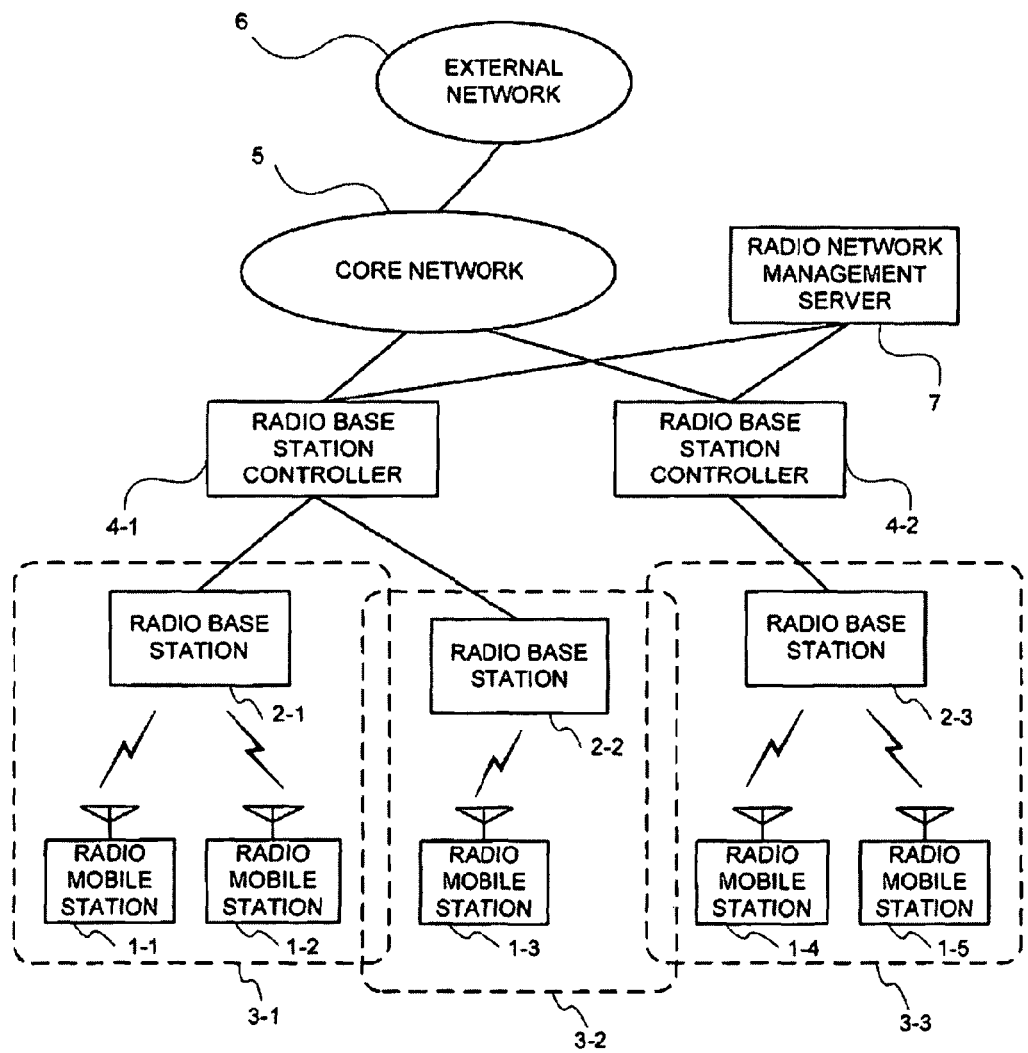
FIG. 1 is a block diagram illustrating the configuration of a radio communication system according to a first embodiment.

1, 1-5 Radio mobile station
2, 1-3 Radio base station
3, 1-3 Radio cell
4, 1-2 Radio base station controller
5 Core network
5-1 Mobile communication exchange
6 External network
11 Quality measuring unit
11a, 41a Block error ratio measuring unit
11b CPICH-RSCP measuring unit
11c Transmission power-TPC measuring unit
12 Call-state detector
12a NAS-CC monitor
12b, 42b Time-out monitor
42c Core network notification monitor
13, 43 Processing unit
14, 44 Storage unit
15 Call destination decision unit
15a Telephone number monitor
16 Radio unit
17, 47, 57 Protocol processing unit
17a, 57a CC processing unit
47b, 57b RANAP processing unit
18 I/O unit
49, 59 Communication interface unit

BEST MODE FOR CARRYING OUT THE INVENTION

Embodiments of the present invention will be explained below by referring to attached drawings.

First Embodiment

FIG. 1 is a block diagram illustrating the configuration of a radio communication system according to an embodiment. In the radio communication system shown in FIG. 1, the radio network performance monitoring method according to the present embodiment is applied to mobile communication systems such as cellular telephones. Referring to FIG. 1, the radio communication system includes radio mobile stations 1-1 to 1-5 such as cellular telephones, radio base stations 2-1 to 2-3, radio base station controllers 4-1 to 4-2, a core network 5, and a radio network management server 7.

In the present embodiment, the radio network means a radio mobile station to radio base station communication network, which is formed by overlapped radio cells formed by respective radio base stations. The core network 5 is a trunk circuit network for a mobile communication system in the present system, which includes mobile communication exchanges, gateways, or various servers. Moreover, the core network 5 is linked to the external network 6 (for example, mobile communication networks of other communication carriers, public circuit networks, ISDN networks) and sets up an interconnection for cellular telephones of other communication carriers, speech messages to ordinary telephones or data communications.

The radio network management server 7 is a server for monitoring the radio network performance of the present system. In the present embodiment, the radio network management server 7 is connected to each radio base station controller via a monitoring network (a communication network) to manage information regarding voluntary termination of communication due to deterioration of communication quality in each radio mobile station. The information regarding voluntary communication termination due to deterioration communication quality in each radio mobile station is referred to as deterioration caused communication termination information.

Radio base stations 2-1 to 2-3 transmit radio signals so as to define radio cells (wave service areas) 3-1 to 3-3, respectively, so that bi-directional radio links are established between a base station and radio mobile stations belonging to the corresponding radio cell. The radio mobile stations 1-1 to 1-5 belong to one radio cell or more, respectively, so that communications (such as speech conversations) are performed via the radio link in the radio cell. In the present embodiment, the radio mobile station performs not only the process for communications but also a detection of voluntary termination of communication due to the deterioration of communication quality.

Each of the radio base station controllers 4-1 to 4-2 is connected to one radio base station or more to control the radio base station, thus controlling the communication of a radio mobile station belonging to a radio cell of the radio base station. Moreover, each radio base station controller is connected the core network 5 to relay control data between a radio mobile station and the core network via the radio base station to be controlled. Hereinafter, the radio mobile station belonging to a radio cell of a radio base station to be controlled is merely referred to as a controlled radio base station. Each of radio base station controllers 4-1 and 4-2 are connected to the radio network management server 7 to gather information regarding deterioration caused communication termination of radio mobile station to be controlled.

In the radio communication system shown in FIG. 1, the radio base station controller 4-1, for example, is connected to the radio base stations 2-1 and 2-2 and the radio base station controller 4-2 is connected to the radio base station 2-3. The radio base station 2-1 defines the radio cell 3-1; the radio base station 2-1 defines the radio cell 3-2, and the radio base station 2-3 defines the radio cell 3-3. In the example of FIG. 1, the radio mobile stations 1-1 and 1-2 belong to the radio cell 3-1, and the radio mobile station 1-3 belongs to the radio cell 3-2 and the radio mobile stations 1-4 and 1-5 belong to the radio cell 3-3.

FIG. 1 shows the three radio base stations and three radio cells. However, the number of radio base stations should not only limited to the embodiment. Alternatively, plural radio base stations may be installed according to the radio communication service area in the present system. Similarly, the number of radio communication base station controllers should not be limited to two. Alternatively, plural radio communication base station controllers may be installed according to the number of radio base stations. The number of radio mobile stations should not be limited to five. Plural radio mobile stations exist according to the number of users of radio communication services in the present system. Hereinafter, the radio mobile stations 1-1 to 1-5 are collectively referred to as a radio base station 1. The radio base stations 2-1 to 2-3 are collectively referred to as a radio base station 2. The radio base station controllers 4-1 and 4-2 are collectively referred to as a radio base station controller 4.

Figure 2:
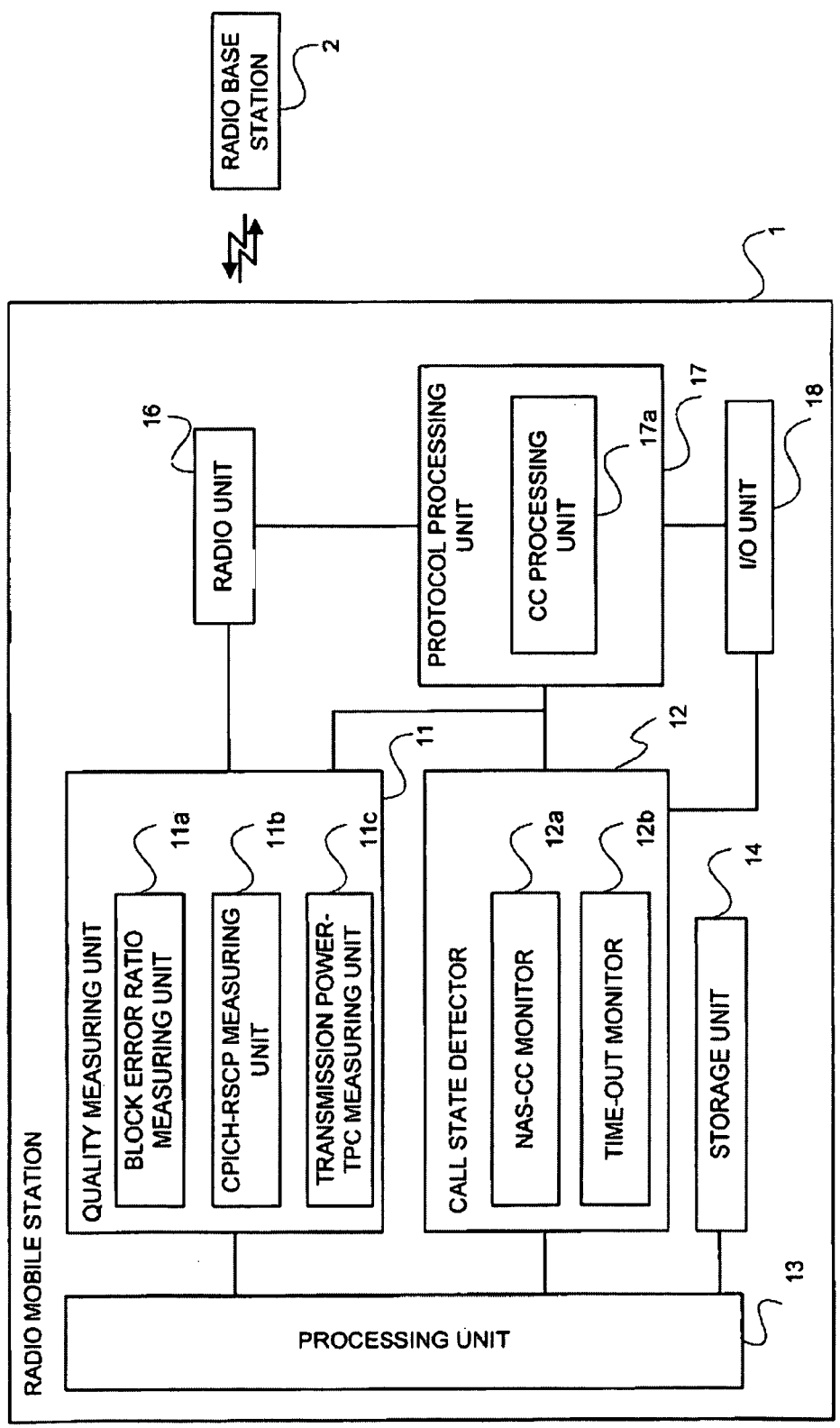
FIG. 2 is a block diagram illustrating the configuration of a radio mobile station 1 in a radio communication system according to the first embodiment.

FIG. 2 is a block diagram illustrating the configuration of the radio mobile station 1 in the radio communication system in the present embodiment. As shown in FIG. 2, the radio mobile station 1 in the present embodiment includes a radio unit 16, a protocol processing unit 17, and an input/output (I/O) unit 18. In order to detect voluntary termination of communication due to deterioration of communication quality in the radio mobile station, the radio mobile station 1 further includes a quality measuring unit 11, a call state detector 12, a processing unit 13, and a storage unit 14. FIG. 2 schematically depicts the elements only related generally to the present invention, as to constituent elements equipped in the radio communication system.

The present invention measures the communication quality of a radio link during communication in the radio communication network and stores the occurrence time when the communication quality has dipped from a predetermined level. The termination cause is decided at the time of communication termination. When the communication termination has been caused by a user's operation, whether or not a user has terminated communications voluntarily due to deterioration of communication quality is decided based on the occurrence time of quality deterioration and based on the communication termination time. When voluntary termination of communication by a user due to deterioration of communication quality is decided, the number of occurrences is summarized. For example, when the interval between an occurrence time at which the quality is below a predetermined value and a communication termination time is less than a predetermined value, it is decided that the voluntary termination of communication by a user due to quality deterioration of communication has occurred. Using speech conversations as an example, the method of grasping quantitatively voluntary termination of communication due to quality deterioration of communication will be explained below.

The quality measuring unit 11 measures the communication quality of a radio link of the down stream (corresponding to the direction transmitted from a radio base station to a radio mobile station), the communication quality of a radio link of the up stream (corresponding to the direction transmitted from a radio mobile station to a radio base station), or both of them. In the case of the W-CDMA (Code Division Multiple Access) scheme mobile communication system, for example, the quality measuring unit 11 measures, as the communication quality of a down stream radio link, PSCP (Received Signal Code Power, desired wave received power) of CPICH (Common Pilot Channel), Ec/No (energy to in-band received power density ratio), or the block error ratio of a transport block. Alternatively, the quality measuring unit 11, for example, measures as the communication quality of an up stream radio link, a group of transmission power of up stream DPDC (Dedicated Physical Data Channel)/up stream DPCCH (Dedicated Physical Control Channel), and TPC (Transmit Power Control) field value of DPCH (Dedicated Physical Channel).

As shown in FIG. 2, the quality measuring unit 11 includes a block error ratio measuring unit 11*a*, a CPICH-RSCP measuring unit 11*b*, and a transmission power-TPC measuring unit 11*c*. For example, the block error ratio measuring unit 11*a* measures a transport block error ratio. The CPICH-RSCP measuring unit 11*b* measures RSCP of CPICH. The transmission power-TCP measuring unit 11*c* measures the communication quality of the up stream radio link based on the transmission power of up stream DPDCH/DPCCH and based on the TCP field of the down stream DPCH.

The block error ratio measuring unit 11*a* measures the transport block error ratio via the protocol processing unit 17. The protocol processing unit 17 performs various processes regarding protocols for radio communication in the radio communication system. The protocol processing unit 17 includes a CC processing unit 17*a* that performs of the termination process of call control messages transmitted and received between a mobile station and the core network via a base station to control at least calls. The transport block error ratio may be calculated periodically and is equal to (the number of transport blocks in which errors are detected during the corresponding duration)/(the total number of transport blocks). The general CRC (Cyclic Redundancy Check) may be used for error detection.

CPICH-RSCP measuring unit 11*b* measures RSCP of CPICH via the radio unit 16. The radio unit 16 converts user data (communication data) and control data, mutually from radio signals into electrical signals, and thus transmits and receives radio signals between radio base stations.

The transmission power-TPC measuring unit 11*c* measures the transmission power of up-stream DPDCH/DPCCH via the radio unit 16. The TCP field of the down-stream DPCH is measured via the protocol processing unit 17. When the transmission power of up-stream DPDCH/DPCCH, for example, has an allowable maximum value and TCP continues to be +1, the quality measuring unit 11 decides that the communication quality of the up-stream radio link is in a low state. Here, TCP (=+1) means that the received power of up-stream DPDCH/DPCCH received in a radio base station is below a predetermined target value. The radio mobile station, which has received the TCP field corresponding to (TCP=+1), increments the transmission power of the up-stream DPDCH/DPCCH by +1. Such transmission power control is called as inner loop transmission control in W-CDMA.

Specifically, the quality measuring unit 11 is realized with an information processing unit such as CPU that runs according to programs.

The call state detector 12 detects the beginning and termination of a call (here, a speech call) and detects the beginning time, termination time, and termination reasons. The call state detector 12 detects, as termination reason, at least the termination operated by a user. The call state detector 12 may detect abnormal termination due to out-of-synchronization of radio link. As method of detecting a termination caused by a user device are quoted, for example, the method of monitoring button operations on the radio mobile station (a radio mobile station equipped with the call state detector 12) and the method of monitoring call control messages (for example, CC messages of NAS (Non Access Stratum) transmitted and received via a base station for the purpose of call control by a radio mobile station in the communication protocols employed in the present radio communication system. Moreover, as the method of monitoring abnormal termination due to out-of-synchronization of a radio link is quoted, for example, the method of monitoring the time-out of the timer (for example, T313 timer defined by 3GPP TS 25.331 V3 20.0) by the time when the upper layer decides disconnection of radio link in response to radio abnormality (out-of-synchronization) notified from the lower layer (physical layer). The expiration of the timer means that the radio link has been disconnected due to abnormality of the physical layer (such as weak wave strength).

The call state detector 12, for example, monitors whether or not the button operation indicating the beginning of a call or the button operation indicating termination of a call during conversation has been performed via the I/O unit 18. The I/O unit 18 is a user interface, such as an operation button, a liquid crystal screen, a microphone, or a loud speaker. The call state detector 12, as shown in FIG. 2, includes a NAS/CC monitor 12*a* and a time-out monitor 12*b*. The NAS/CC monitor 12*a* monitors CC messages and the time-out monitor 12*b* monitors the time-out.

The speech state detector 12, for example, monitors whether or not the NAS/CC monitor 12*a* has transmitted or received CC messages (CC messages of type CONNECT) requiring the beginning of a call via the CC processing unit 17*a* or whether or not the NAS/CC monitor 12*a* has transmitted or received CC messages (CC messages of type DISCONNECT) requiring the termination of a call. The reason of termination may be detected by referring to the reason of termination added to the disconnection request message.

Moreover, in the call state detector 12, the time-out monitor 12*b*, for example, monitors whether or not the timer that detects disconnection of an abnormal radio link of the physical layer has expired, via the protocol processing unit 17. When the expiration of the timer is monitored, it may be decided that the call state detector 12 has detected an abnormal termination due to out-of-synchronization of a radio link.

By deciding the destination or identifier of a message in the message process for exchanging messages or time-out notification messages, the messages or time-out can be monitored. Monitoring CC messages is not only the method for detection of the beginning or termination of a call. Alternatively, by monitoring whether or not the state function (for example, RRCState), representing a connection state, held in a radio mobile station has transitioned during communication (for example, Cell-DCH) or in an idle state (Idle), the beginning or termination of a call may be detected. The beginning or termination time may be detected by obtaining the time when the beginning or termination of a call has detected with the timepiece (not shown), which measures the current time.

Specifically, the call state detector 12 is realized with an information processing unit such as a CPU that operates according to programs. The call state detector 12 may be realized as one function of the protocol controller that controls the communication protocol for a radio mobile station.

Based on the communication quality of a radio link measured by the quality measuring unit 11 and based on the beginning time, termination time, and termination reason of a call detected by the call state detector 12, the processing unit 13 decides whether or not a user has terminated voluntarily due to deterioration of communication quality. Based on the decision results, the processing unit 13 counts the number of times a user has terminated voluntarily due to deterioration of communication quality and stores it into the storage unit 14. Specifically, the processing unit 13 is realized with an information processing unit, such as a CPU that operates according to programs.

The storage unit 14 stores information regarding deterioration caused communication termination in the radio mobile station or information necessary to decide whether or not the communication termination of the radio mobile station is communication terminated voluntarily by a user due to deterioration of communication quality. In the present embodiment, the storage unit 14 stores, as information on deterioration caused communication termination, the accumulated number of telephone calls and the accumulated number of occurrences of communication terminated voluntarily by a user due to deterioration of communication quality. Moreover, the storage unit 14 stores, as information necessary to decide whether or not a user has terminated voluntarily communications due to deterioration of communication quality, a deterioration beginning time and its continuous time, during communication. If necessary, the storage unit 14 may store evaluated values of communication quality in communication, the beginning time and termination time of communication, or reasons for termination.

Figure 3:
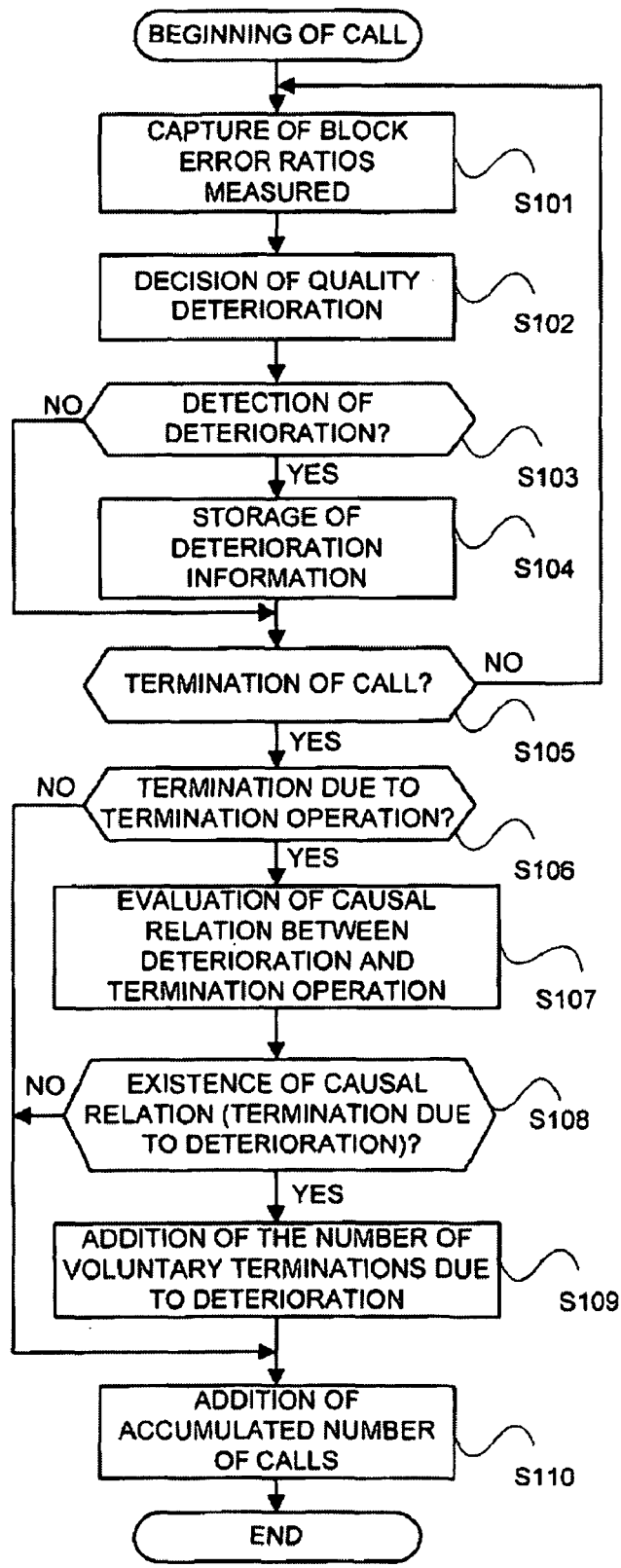
FIG. 3 is a flowchart illustrating a process flow ranging from a beginning of communication to a termination of a call in the processing unit 13 according to the first embodiment.

FIG. 3 is a flow chart illustrating a process flow ranging from the beginning of communication to the termination of a call in the processing unit 13 in the present embodiment. As shown in FIG. 3, when the call state detector 12 detects the beginning of call of a user, the processing unit 13, for example, monitors the deterioration state of communication quality till the call termination is detected (repetition of NO in step S105). The processing unit 13 captures communication quality measured values (here, a block error ratio of a transport block in a down stream radio link) measured periodically by the quality measuring unit 11 (step S102). Then, based on the resultant communication quality measured values, the processing unit 13 decides the deterioration state of the current communication quality (the presence or absence of occurrence of deterioration) (step S102). The processing unit 13 may capture RSCP measured values of CPICH to decide the deterioration state of communication quality. When the quality measuring unit 11 detects the communication quality as the presence or absence of deterioration, the process of deciding deterioration state in the processing unit 13 is omitted. In step S102, the processing unit 13 decides the deterioration state of the current communication quality and stores deterioration information (for example, the presence or absence of deterioration, a beginning time of deterioration, and a continuous time of deterioration) into the storage unit 14 based on the decision results (steps S103 and S104).

Figure 4:
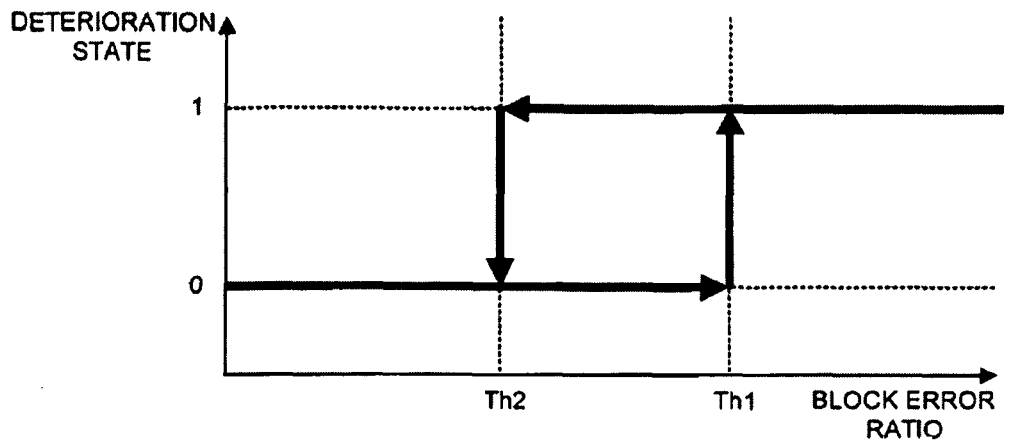
FIG. 4 is a diagram explaining an example of deciding the presence or absence of deterioration of communication quality, by using the threshold decision attended with hysteresis.
Figure 5:
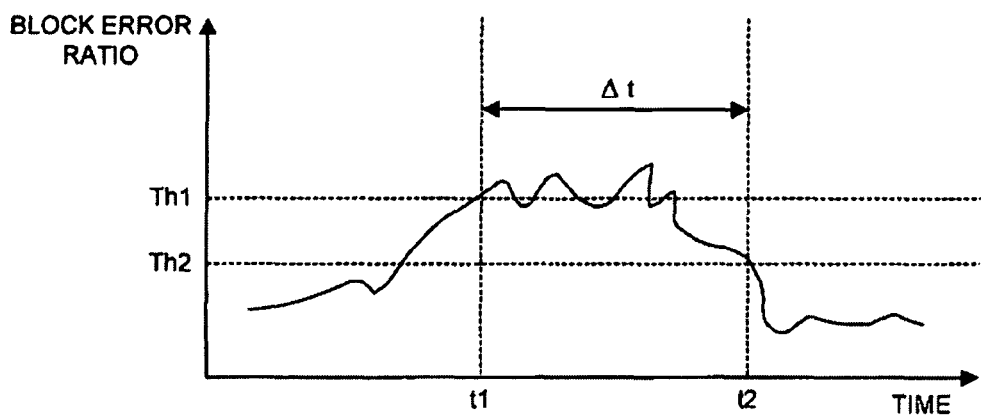
FIG. 5 is a diagram explaining an example of deciding the presence or absence of deterioration of communication quality, by using the threshold decision attended with hysteresis.

The threshold decision, which, for example, involves hysteresis, generally known, may be employed for deciding the presence or absence of deterioration of communication quality. FIG. 4 and FIG. 5 are explanatory diagrams each showing a decision example of the presence or absence of deterioration of communication quality, which uses the threshold decision associated with hysteresis. FIG. 4 is an explanatory diagram showing block error ratio to deterioration state relationships. In FIG. 4, the ordinate axis represents a deterioration state showing the presence or absence of deterioration of communication quality while the abscissa axis represents a block error ratio as a measured result of communication quality. A deterioration state of 0 represents no occurrence of deterioration of a communication quality and a deterioration state of 1 represents an occurrence of deterioration of a communication quality.

As to the block error ratio, two threshold values (Th1 and Th2) are defined preliminarily. With the block error ratio exceeding Th1, the deterioration state changes to 1. With the block error ratio lowering Th2, the deterioration state changes to 0. When a deterioration state of 0 is set as an initial value, the processing unit 13, for example, decides whether or not the block error ratio has exceeded Th1. When the block error ratio exceeds Th1, the deterioration state shifts to 1. With a deterioration state of 1, the processing unit 13 decides whether or not the block error ratio is below Th2. When the block error ratio is below Th2, the deterioration state shifts to 0. The processing unit 13 stores the information representing the deterioration state into the storage unit 14. When the deterioration state changes from 0 to 1 (that is, a deterioration occurrence is detected), the processing unit 13 may store the corresponding time as a deterioration beginning time into the storage 14. When the deterioration state changes from 1 to 0 (that is, elimination of deterioration is detected), the processing unit 13 may calculate a continuous period of deterioration based on the event time and based on the deterioration beginning time stored in the storage unit 14 and then store the result into the storage unit 14. Instead of a continuous period of deterioration, the time when deterioration elimination has been detected may be stored as a deterioration termination time.

FIG. 5 is an explanatory Diagram showing block error ratio to time relationships. In FIG. 5, the ordinate axis represents a block error ratio while the abscissa axis represents time. FIG. 5 shows a block error ratio above Th1 at time t1 and a block error ratio below Th2 at time t2. Referring to FIG. 5, t1 represents a deterioration beginning time and t2 represents a deterioration termination time. The time period Δt between the time t1 and the time t2 is a deterioration continuous period. When communication is terminated in the deterioration of 1, the call termination time may be defined as a deterioration termination time.

Next, when the call state detector 12 detects termination of communication (Yes in step S105), the processing unit 13 decides whether or not the termination reason detected by the call state detector 12 is the communication termination associated with the user operation (step S106). As described above, the call state detector 12 always monitors CC messages transmitted and received by the radio mobile station (a radio mobile station with the call state detector 12) during calling. For example, when it has detected CC messages of type DISCONNECT transmitted from a radio mobile station at a termination time of communication, the call state detector 12 produces, as termination reasons, information representing communication termination due to a user's operation. Moreover, when it has detected the time-out of T313 timer, with no transmission of the DISCONNECT, the call state detector 12 produces, as termination reasons, information representing 2-5 abnormal termination due to out-of-synchronization in a radio link. Moreover, when detecting that a radio mobile station has received CC messages of type DISCONNECT, the call state detector 12 produces, as termination reasons, the information representing communication termination due to an opposite party's operation. The processing unit 13 refers to information representing the termination reason output from the call state detector 12 and decides whether or not the termination reason corresponds to the communication termination due to a user's operation. When the decision result in the step S106 proves that the communication termination has caused by a user's operation, the processing unit 13 evaluates the causal relation between deterioration and termination operation to decide whether or not the communication termination has caused by a user's operation due to deterioration of communication quality (step S107).

The processing unit 13 decides the presence or absence of a causal relation between deterioration and termination operation, based on the termination operation time and based on deterioration information stored in the storage unit 14. When deterioration condition is stored as deterioration information, the processing unit 13, for example, decides that a causal relation exists between deterioration and termination operation. Moreover, when the beginning time of deterioration of a communication quality is stored as deterioration information, the processing unit 13, for example, calculates a difference between the termination operation time and the deterioration beginning time. If the resultant difference is less than a predetermined threshold value, the processing unit 13 decides that a causal relation exists between deterioration and termination operation.

Figure 6:
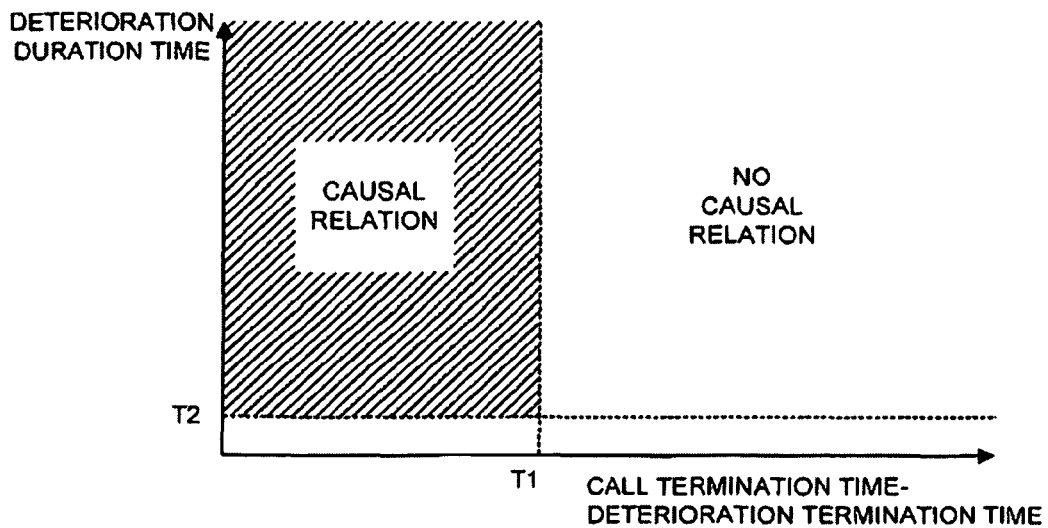
FIG. 6 is an explanatory diagram illustrating an example deciding the presence or absence of a causal relation between deterioration and termination operation.

The processing unit 13, for example, may decide the presence or absence of the causal relation between deterioration and termination operation, based on the termination operation time, the beginning time of deterioration of communication quality or a deterioration continuous period. FIG. 6 is an explanatory diagram illustrating a decision example of the presence or absence of a causal relation between deterioration and a termination operation. Referring to FIG. 6, the abscissa axis represents a difference between a communication termination time and a deterioration termination time (hereinafter referred to as a termination time difference) and the ordinate axis represents a deterioration continuous period of time. The deterioration termination time is obtained by adding a beginning time of deterioration and a continuous period of deterioration. The threshold value T1 is defined on the abscissa axis and T2 is defined on the ordinate axis. In other words, the threshold value T1 is previously defined to a termination time difference and the threshold value T2 is previously defined to a deterioration continuous period.

The processing unit 13 first calculates a termination time difference, corresponding to a difference between a communication termination time and a deterioration termination time, and decides whether or not the resultant termination difference is T1 or more. When the termination time difference is T1 or more or communications continues for a predetermined period of time from the termination of deterioration, the processing unit 13 decides that the communication termination has no relation with deterioration of communication quality (no causal relation), irrespective of a deterioration continuous period. When the termination time difference is less than T1, the processing unit 13 decides the causal relation according to a deterioration continuous period of time. Specifically, it is decided whether or not the deterioration continuous period is less than T2. If the deterioration continuous period of time is less than T2, it is decided that there is no causal relation. If not so (or the deterioration continuous time period is T2 or more), it is decided that there are causal relations.

When it is decided that there is a causal relation between deterioration and termination operation in the step S107 or that the communication termination has caused by a user's operation due to deterioration of communication quality (is a voluntary communication termination by a user due to deterioration of communication quality) (YES in step S108), the processing unit 13 increments by 1 the counter in the storage unit 14, which represents the accumulated number of occurrences (step S109). When the processing unit 13 decides that the call termination is not caused by a user's operation in the step S107 (NO in step A108), the flow goes to the step S110 to count the accumulated number of messages.

Finally, without depending on reasons for communication termination or decision results on causal relations between deterioration and termination operations the processing unit 13 increments by 1 the counter in the storage unit 14, which represents the accumulated number of calls, (Step S110). The accumulated number of calls can be used to calculate the frequency of communication termination by a user's judgment due to deterioration of communication quality.

The processing unit 13 transfers information stored in the storage unit 14 to the radio network management server 7 via the radio link and the monitoring network, with a predetermined timing. The processing unit 13, for example, reads out an accumulated number of calls and an accumulated number of occurrences of communication terminated voluntarily by a user due to the deterioration of communication quality, stored in the storage unit 14, every fixed period. Then the processing unit 13 transmits deterioration cause communication termination information to the radio network management server 7 via the radio base station and the radio base station controller. The scheme of transfer message or routing may be arbitrarily chosen. For example, encoding may be performed to XML and transferring may be performed according to HTTP and routing may be performed according to IP addresses. The radio network management server 7 summarizes information together with data transferred from other radio mobile stations and utilizes them for windows on the management screen.

According to the present embodiment described above, it is decided whether or not communication has been terminated through a user's operation, as shown in the step S107. If yes, because further decision is made to the causal relation to communication quality deterioration, the phenomenon that a user terminates communications due to deterioration of communication quality can be grasped quantitatively. As a result, a suitable handling, such as expansion of base stations, and improvements in a service quality can be performed according to the phenomenon.

In the present embodiment, the example has been explained where the processing units (such as the quality measuring unit 11, the call state detector 12, and the processing unit 13) according to the present invention are configured independently of the basic constituent elements (such as a protocol processing unit or a radio unit), which realize basic functions in a radio mobile station. However, when being realized as an application program running on a CPU, the processing units of the present invention may be built in, for example, the application program realizing the protocol processing unit. In such a case, it is assumed that the interface (information capture API) is provided for capturing information necessary for the processing units according to the present invention, using the application program realizing the protocol processing unit.

Moreover, according to the present embodiment, a binary decision including "cause-and-effect" and "no cause-and-effect" has been quoted as an example in the causal relation decision between deterioration of communication quality and communication termination. However, the method may be considered of defining areas corresponding to continuous values representing the strength in causal relation on the axis shown in FIG. 6 and recording an accumulated number of occurrences in each area.

In the present embodiment, the example has been shown where the radio mobile station 1 includes the quality measuring unit 11, the call state detector 12, and the processing unit 13 and performs a quality measuring process, a call state detecting process, and a process for deciding a causal relation between deterioration of communication quality and communication termination. However, part or all of those processes may be performed in the radio base station 2 or the radio base station controller 4.

Figure 7:
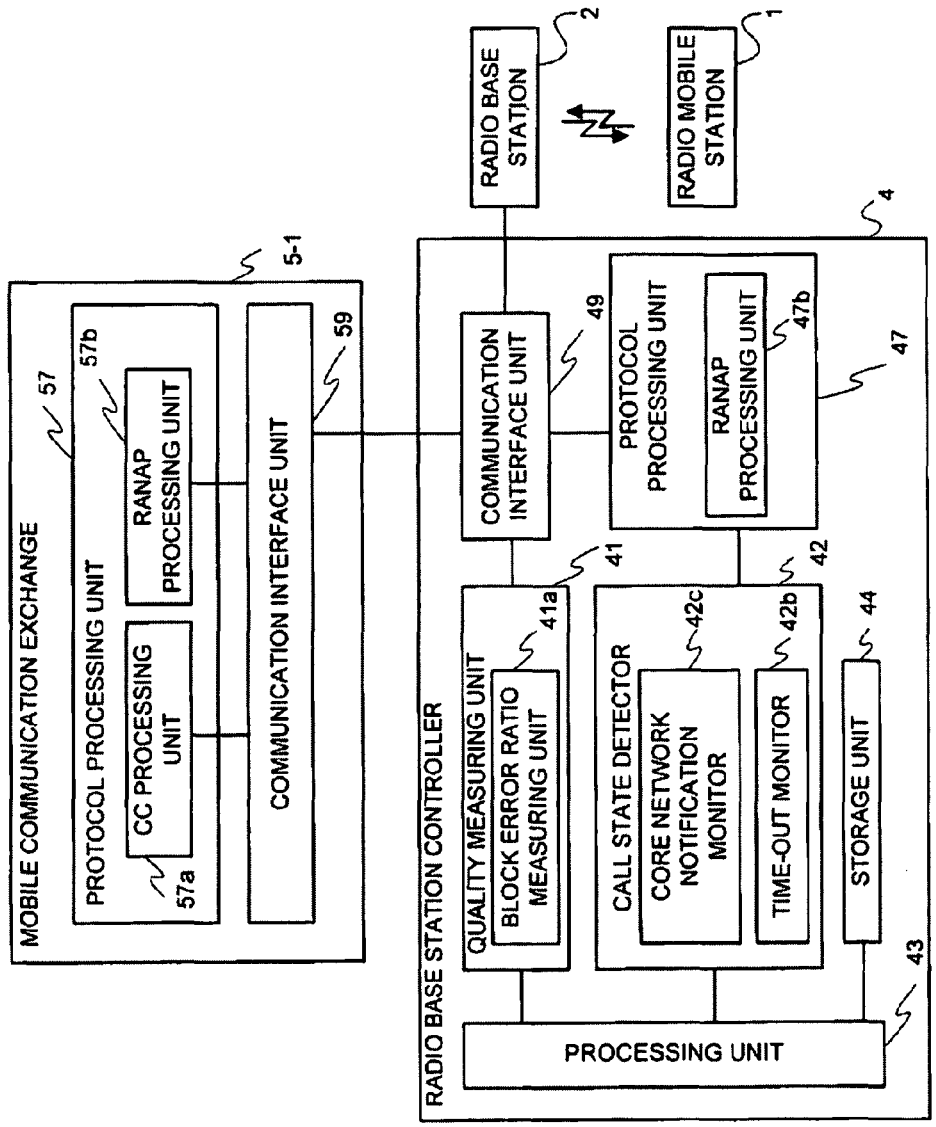
FIG. 7 is a block diagram illustrating another configuration of a radio communication system according to the first embodiment.
Figure 8:
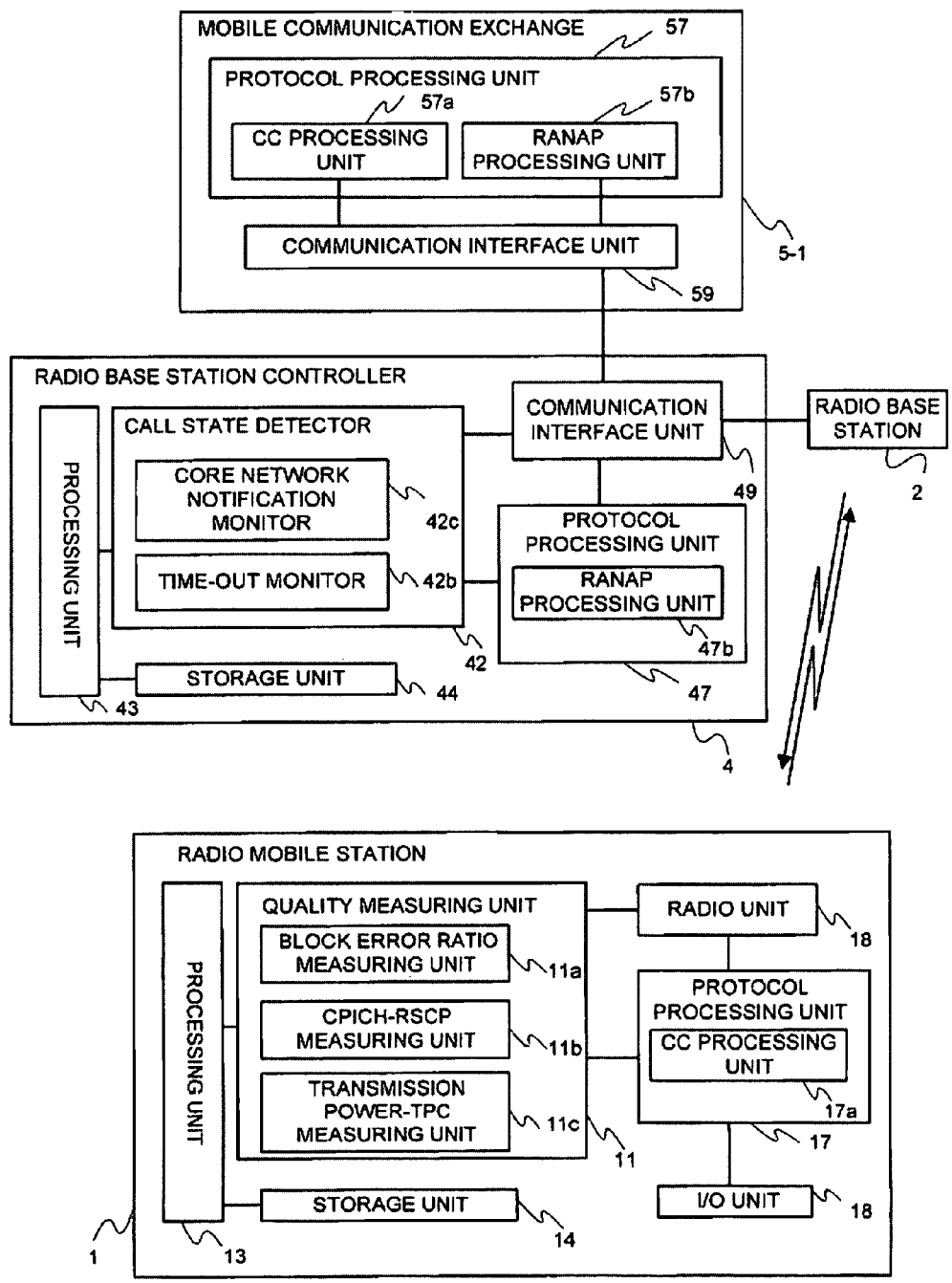
FIG. 8 is a block diagram illustrating another configuration of a radio communication system according to the first embodiment.

FIG. 7 and FIG. 8 are block diagrams each illustrating another configuration in a radio communication system according to the present embodiment. FIG. 7 illustrates the configuration in that the base station controller 4 implements all of quality measurement, call state detection, and decision of a causal relation between deterioration of communication quality and communication termination. Referring to FIG. 7, the radio base station controller 4 includes a communication interface unit 49 and a protocol processing unit 47. However, to realize detect a voluntary termination of communication due to deterioration communication quality in a radio mobile station to be controlled by the radio base station controller, the radio base controller 4 further includes a quality measuring unit 41, a call state detector 42, a processing unit 43, and a storage unit 44.

The quality measuring unit 41 measures a block error ratio of a transport block in a radio link in the up or down stream or both thereof in a radio mobile station to be controlled. The quality measuring unit 41 may include, for example, a block error ratio measuring unit 41$a$, which measures an error ratio of a transport block. The method for measuring a block error ratio corresponds to the block error ratio measuring unit 11$a$ in the radio mobile station 1 and hence the duplicate explanation will be omitted here.

The call state detector 42 detects the beginning and termination of a call in a radio mobile station to be controlled, thus detecting the beginning time, the termination time and the termination reason. The call state detector 42 may include, for example, a core network notification monitor 42$c$ and a time-out monitor 42$b$. That is, the call state detector 42 in the radio base station controller 4 includes a core network notification monitor 42$c$, instead of the CC message monitor 12$a$ in the radio mobile station 1. Because the method of monitoring the time-out with the time-out monitor 42 corresponds to the time-out monitor 12 in the radio mobile station 1, the duplicate explanation will be omitted here.

The configuration in FIG. 7 is characterized in that the call state detector 42 includes the core network notification monitor 12$c$ to decide that the reason for communication termination lies in a termination of communication due to a user's operation based on the notification from the core network 5. In the radio base station controller 4, the call state detector 42 can include the NAS/CC monitor 42$a$ to monitor the CC message. However, Since the CC message is a protocol terminated between the radio mobile station 1 and the core network 5, it is more convenient to monitor the notification message sent from the core network 5. FIG. 7 illustrates roughly only the constituent elements related to the present invention, equipped with the radio communication system.

In the call state detector 42, the core network notification monitor 42$c$ monitors notification messages transmitted from the core network 5. In the call state detector 12, the core network notification monitor 42$c$ further monitors whether or not a notification message notified when a radio mobile station to be controlled begins a call or a notification message notified when it receives the call has been received via the RANAP processing unit 47$b$ in the protocol processing unit 47. The reason for termination can be detected by referring to the termination reason added to a notification message indicating call termination. Specifically, merely refer to the Cause field of IU Release Command of RANAP. IU Release Command means the message transmitted from a core network 5

(for example, the mobile communication exchange 5-1) to the radio base station controller 4 after the core network 5 processes the CC message of type DISCONNECT, which is exchanged between the core network 5 and the radio mobile station 1. Notification messages are exchanged between the mobile communication exchange 5-1 and the radio base station controller 4. That is, an exchange of notification messages is performed between the RANAP processing units 57b and 47b via the communication interface unit 59 and 49, respectively.

As to each radio mobile station to be controlled, the processing unit 43 decides whether or not a user has terminated communications voluntarily due to deterioration of communication quality, based on a communication quality of a radio link measured by the quality measuring unit 41 and based on the communication beginning time, termination time and termination reason, detected by the call state detector 42. The processing unit 43 counts the number of times a user has terminated voluntarily due to deterioration of communication quality, based on the decision results, and then stores it into the storage unit 44. Because the deciding method and the counting method, carried out in the processing unit 43, corresponds to the method carried out in the processing unit 13 in the radio mobile station 1 and hence the duplicated explanation will be omitted here.

The storage unit 44 stores deterioration cause communication termination information in each radio mobile station to be controlled and information necessary to decide whether or not the communication termination in the radio mobile station corresponds to the communication terminated voluntarily by a user due to deterioration of communication quality.

The processing unit 43 transfers information, stored as deterioration cause communication termination information, to the radio network management server 7 via, for example, the monitoring network, with a predetermined timing. For example, the processing unit 43 may transmit the information to the radio network management server 7 every constant period or in response to a polling request from the radio network management server 7.

FIG. 8 illustrates the configuration for deciding a causal relation between deterioration of communication quality and communication termination, in cooperation with a radio mobile station and a radio base station controller. As shown in FIG. 8, a radio mobile station 1, for example, includes a quality measuring unit 11, a processing unit 13, and a storage unit 14. A radio base station controller 4, for example, includes a call state detector 42, a processing unit 43, and a storage unit 44. In such a configuration, a combination of the quality measuring unit 11 and the processing unit 13 in the radio mobile station 1 calculates a beginning time of deterioration of communication quality and a continuous period of deterioration. Then the calculated results are temporarily stored into the storage unit 14 in the radio mobile station 1. The call state detector 42 in the radio base station controller 4 detects the beginning and termination of calling in each radio mobile station to be controlled and detects the beginning time, termination time, and reason for termination. The radio base station controller 4 stores the results temporarily into the storage unit 44. Then, the radio mobile station 1 transfers the beginning time of deterioration of communication quality and the deterioration continuous period. The processing unit 43 in the radio base station controller 4 evaluates causal relations between deterioration and termination operation.

As described above, various functions are distributed among the radio mobile station 1 and the radio base station controller 4 for a radio base station) and communications are suitably established for cooperation between those functions.

However, the present configuration is substantially identical to the method explained with the configuration in FIG. 1. Combinations of dispersed functions or the configuration and method including different communication procedures will be easily analogized.

In the embodiment described above, the case has been explained where a user performs speech communications in a mobile communication system applied to the present invention. However, the present invention is applicable even to the case where a user performs packet communications. In the packet communication, the beginning and termination of communication correspond to establishment and releasing of Packet Data Protocol (PDP) context or to the beginning and completion of session of Hypertext Transfer Protocol (HTTP). The communication termination performed voluntarily by a user corresponds to a release operation of PDP context or a cancellation of HTTP request (or holding down the cancel button). Establishment and release of PDP context can be detected by monitoring, for example, Session Management (SM) message of NAS. Beginning and completion of HTTP session can be detected in relation to, for example, a user operation in a browser.

In a concrete example, the beginning of packet communication can be detected by monitoring SM messages of type Active PDP Context Accept transmitted from the radio mobile station 1 or the core network 5. The termination of communication can be detected by monitoring whether or not the state variable (for example, RRCS state) representing a connection state held in the radio mobile station 1 has changed from a state, except an idle state, into an idle state.

Second Embodiment

Figure 9:
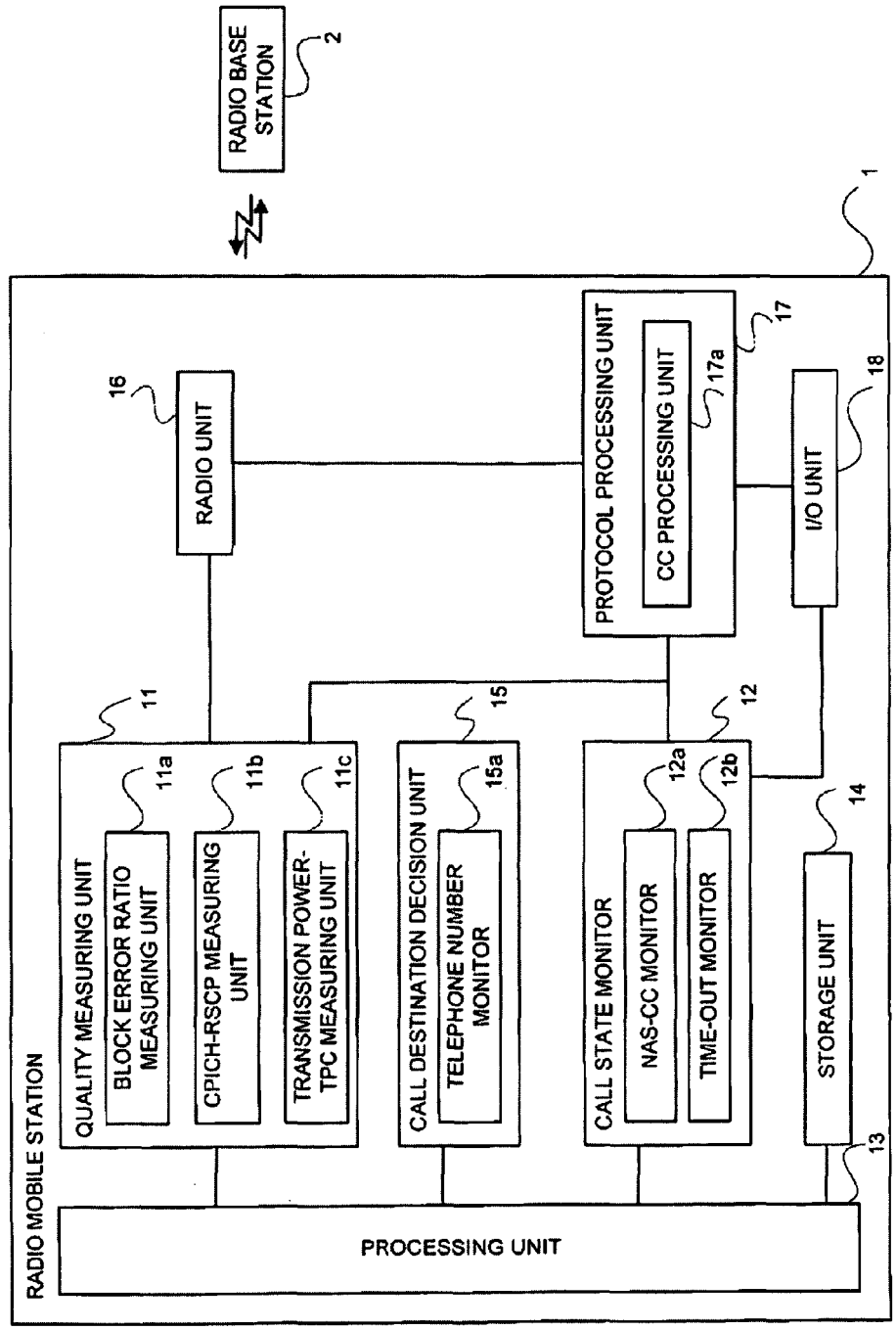
FIG. 9 is a block diagram illustrating the configuration of the radio mobile station 1 in a radio communication system according to a second embodiment.

FIG. 9 is a block diagram illustrating the configuration of the radio mobile station 1 in a radio communication system, according to the second embodiment. The basic configuration of a radio communication system in the present embodiment is identical to that in the first embodiment shown in FIG. 1. The present embodiment aims at grasping quantitatively the phenomenon that a user has terminated communications voluntarily due to deterioration of communication quality and the phenomenon that the user has tried re-dialing after a movement to an area in good wave conditions.

In the present embodiment as shown in FIG. 9, the radio mobile station 1 further includes a call destination decision unit 15, different from the first embodiment shown in FIG. 2. The call destination decision unit 15 cooperates with the call state detector 12 to extract an identifier (a communication destination identifier) specifying a communication opposite party (for example, a telephone number). In the case of speech communication, monitoring a telephone number contained in a CC message is quoted as a concrete example. The call destination decision unit 15 may include a telephone number monitor 15a. When the call state detector 12, for example, detects the beginning of a call, the telephone number monitor 15a detects a communication destination identifier (for example, a telephone number) contained in a CC message via the NAS-CC monitor 12a. Specifically, the call destination decision unit 15 is realized with an information processing unit, such as a CPU which operates according to programs.

According to the present embodiment, the processing unit 13 counts the number of times a user has terminated communications voluntarily due to deterioration of communication quality. Moreover, when it is decided that the termination is a voluntary communication termination, the processing unit 13 stores the identifier of the corresponding communication opposite party, compares it with the identifier of the communication opposite party in the next communication, decides whether or not the user has tried re-dialing for communication due to deterioration of communication quality and summarizes the number of times of re-dialing of communication (temporary interrupt and resuming). Therefore, the storage unit 14 stores an accumulated number of occurrences of re-dialing due to deterioration of quality.

Figure 10:
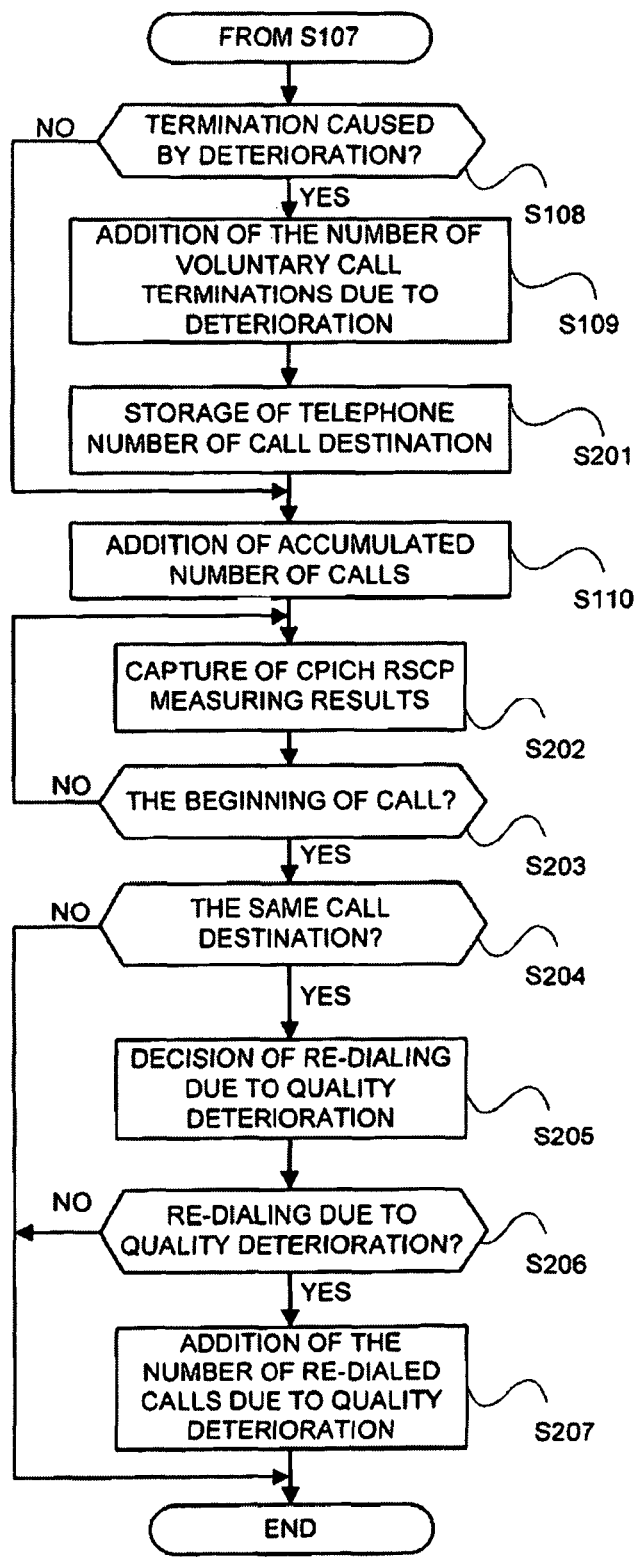
FIG. 10 is a flowchart illustrating a process flow in the processing unit 13 according to the second embodiment.

FIG. 10 is a flow chart illustrating a process flow in the processing unit 13 according to the present embodiment. FIG. 10 shows steps continuing from steps S107 in FIG. 3. When it is decided that a termination of communication has caused by a user's operation due to deterioration of communication quality (or is a communication termination performed voluntarily by a user due to deterioration of communication quality) (Yes in step S108), the processing unit 13 increments by 1 the counter, which indicates an accumulated number of occurrences of communication terminated by a user due to deterioration of communication quality (step S109). In addition, the processing unit 13 stores the call destination identifier detected by the call destination decision unit 15 into the storage unit 14 (step S201). When termination is not caused by deterioration (NO in step S108), the call destination identification stored in the storage unit 14 may be cleared. The processing unit 13 stores information necessary for deciding re-dialing due to deterioration of communication quality (here, a call termination time and information regarding qualities at a termination time) into the storage unit 14, together with communication destination identifiers.

Thereafter, the processing unit 13 enters a waiting mode to detect the beginning of the next call by the call state detector 12. As the meanwhile, the quality measuring unit 11 captures periodically information regarding communication qualities (quality information) (step S202). The quality information corresponds to RSCP of CPICH, or information representing a radio quality, for example, at non-communication time.

Thereafter, when the call state detector 12 detects the beginning of a new call (YES in step S203), the processing unit 13 receives the call destination identifier of the current call from the call destination decision unit 15 and compares it with the call destination identifier stored in the storage unit 14. When the compared identifier corresponds to the same call destination (YES in step S204), the processing unit 13 decides whether or not the current call has caused by re-dialing due to quality, deterioration (step S205). The time period elapsed from the previous call and the quality information captured in the step S202 are used for the decision. Specifically, when the quality at the beginning of a new call is improved by a predetermined value, compared with the quality at the termination of the previous call termination time, and the elapsed time between the previous call termination and the beginning of the new call is within a fixed time period, the processing unit 13 decides that the new call corresponds to re-dialing due to quality deterioration. Now, it is assumed that the processing unit 13 captures the quality information at the previous call termination time via the quality measuring unit 11, for example, in the step S201, and stores it into the storage unit 14.

When re-dialing due to the quality deterioration is decided (YES in step S206), the processing unit 13 increments by 1 the counter in the storage unit, which represents the accumulated number of occurrences of re-dialing (step S207).

According to the present embodiment as described above, a call destination identifier in call termination by a user's operation due to quality deterioration is stored and the time of the next call, the call destination and the quality at the beginning of a call are analyzed. Thus, the phenomenon of re-dialing due to quality deterioration can be grasped quantitatively. As a result, the present embodiment can accurately grasp complicated actions forced to a user due to defective network maintenance and allows a suitable handling and improved service quality, such as expansion of base stations, through the accurate grasping.

In the present embodiment, the radio mobile station 1 includes the quality measuring unit 11, the call state detector 12, the processing unit 13, and the call destination decision unit 15. The radio mobile station 1, for example, implements the quality measuring step, the call state detecting step, the step of deciding causal relations between deterioration of communication quality and communication termination, and the step of deciding re-dialing. However, the radio base station 2 or the radio base station controller 4 may perform part or all of the steps described above, in a manner similar to that in the first embodiment.

The present invention is applicable suitably to radio communication systems, each which offers various communication services via radio networks, such as mobile communication systems including mobile terminals such as PDAs, without being limited to cellular telephones.

The invention claimed is:

1. A method for monitoring the communication performance of a radio communication network, comprising the steps of:
   measuring the quality of a radio connection while a radio communication terminal of a user is during communication;
   deciding the presence or absence of a quality deterioration based on measured values of said quality;
   deciding whether or not termination has caused by an operation of said user at a communication termination time and deciding whether or not said termination is a voluntary communication termination by a user due to quality deterioration of communication, using deterioration information based on decision results of the presence or absence of said quality deterioration, when the termination has caused by said user's operation; and
   summarizing the number of occurrences of the phenomenon occurs that said user terminates communications voluntarily due to quality deterioration of communication.

2. The radio network performance monitoring method defined in claim 1, further comprising the steps of:
   detecting and storing a quality deterioration occurrence time based on decision results on the presence or absence of quality deterioration during communication of a radio communication terminal;
   detecting a termination time of communication at an end of communication; and
   deciding that said termination is a voluntary communication termination by a user due to quality deterioration of communication when communication termination has caused by a user's operation while a time interval between an occurrence time of said quality deterioration and a termination time of said communications is less than a predetermined value.

3. The radio network performance monitoring method defined in claim 1, further comprising the step of:
   detecting, as radio connection quality information, at least one of a desired wave received power of a common pilot channel, a ratio of energy to in-band received power density, a block error ratio of a transport block, and a transmission power control state based on transmission power of a individual channel and based on a transmission power control field value; and
   thus measuring a radio connection quality.

4. The radio network performance monitoring method defined in claim 1, further comprising the step of:
monitoring at least one of a user' button operation and transmission of a call control message for call control; and
thus deciding whether or not communication has been terminated due to user's operation.

5. The radio network performance monitoring method defined in claim 1, further comprising the steps of:
calculating a difference between an occurrence time of quality deterioration and a communication termination time when communication termination has caused by a user's operation; and
thus deciding that said termination is a voluntary communication termination by a user due to quality deterioration of communication, when said resultant difference is less than a predetermined threshold value.

6. The radio network performance monitoring method defined in claim 1, further comprising the step of:
deciding that said termination is a voluntary communication termination by user due to quality deterioration of communication, when communication termination is caused by a user's operation while a difference between an occurrence time of quality deterioration and a communication termination time is less than a predetermined threshold value and a duration of quality deterioration is said predetermined time or more.

7. The radio network performance monitoring method defined in claim 1, further comprising the steps of:
storing a communication destination identifier, which identifies a communication opposite party, when decision indicates that a user has terminated communications voluntarily due to communication quality deterioration;
deciding whether or not re-dialing to the same communication opposite party has been made based on a communication destination identifier in a current communication and a communication destination identifier stored in the previous communication at the next communication time; and
summarizing the number of occurrences of re-dialing due to communication quality deterioration.

8. The radio network performance monitoring method defined in claim 7, comprising the steps of:
storing a communication destination identifier, a quality measured value in communication termination, and a communication termination time; and
deciding that the current communication corresponds to re-dialing due to communication quality deterioration when, to the same communication opposite party, the quality at the beginning of the current communication is improved more than a predetermined value, compared with the quality at the end of the previous communication, and when an elapsed time between the termination of the previous communication and the beginning of the current communication is within a predetermined duration.

9. A radio communication system for providing a communication service to a radio communication terminal operated by a user, comprising:
a quality measuring unit for measuring a radio connection quality during communication of a radio communication terminal;
a deterioration information detector for deciding the presence or absence of quality deterioration based on information indicating qualities measured by said quality measuring unit and detecting deterioration information based on decision results on the presence or absence of said quality deterioration;
a call state detector for detecting the beginning and termination of communication of said radio communication terminal or a cause of termination indicating whether or not termination has occurred due to a user's operation;
a termination cause decision unit for deciding a termination cause detected by said call state detector in communication termination and deciding whether or not said communication termination is a voluntary communication termination by a user due to communication quality deterioration, using deterioration information detected by said deterioration information detector when said termination has occurred due to a user's operation; and
a summation unit for summarizing the number of occurrences of voluntary communication termination by a user due to communication quality deterioration, based on decision results by said causal relation decision unit.

10. A radio communication system, comprising:
a radio communication terminal operated by a user; and
a radio network controller connected to said radio communication terminal via a radio communication network;
said radio communication terminal including:
a quality measuring unit for measuring a radio connection quality during communication of said radio communication terminal;
a deterioration information detector for deciding the presence or absence of quality deterioration based on information indicating the quality measured by said quality measuring unit and detecting deterioration information based on decision results of the presence or absence of said quality deterioration;
a call state detector for detecting the beginning and termination of communication of a radio communication terminal or a termination cause indicating whether or not termination has occurred due to a user's operation;
a termination cause decision unit deciding a cause of termination detected by said call state detector in communication termination and deciding whether or not said termination is a voluntary communication termination by a user due to quality deterioration of communication, using deterioration information detected by said deterioration information detector when termination has occurred due to a user's operation; and
a counter unit for counting the number of occurrences of voluntary communication termination by a user due to communication quality deterioration based on decision results by said causal relation decision unit;
said radio network controller including:
a summation display unit for summarizing and displaying the number of occurrences of voluntary communication termination by user due to communication quality deterioration in each radio communication terminal.

11. The radio communication system defined in claim 10, wherein said radio communication terminal comprises a communication destination detector for detecting a communication destination identifier that identifies a communication opposite party;
wherein said counter unit stores said communication destination identifier into a storage unit when decision indicates that said termination is a voluntary communication termination by a user due to communication quality deterioration;
said counter unit deciding whether or not re-dialing has been performed to the same communication opposite party in the next communication, based on a communication destination identifier in a current communication and based on a communication destination identifier stored in the previous communication, and counting the number of occurrences of re-dialing due to communication quality deterioration; and wherein said summation display unit summarizes and displays the number of occurrences of re-dialing due to communication quality deterioration of each radio communication terminal.

12. A radio communication system, comprising:
a radio communication terminal operated by a user; a radio base station controller for controlling a radio base station for establishing a bi-directional radio link to said radio communication terminal and a radio network management unit at least connected to said radio base station controller via a radio communication network;
said radio base station controller including:
a quality measuring unit for measuring a radio connection quality of said radio communication terminal during communication of said radio communication terminal belonging to said radio station to be controlled;
a deterioration information detector for deciding the presence or absence of quality deterioration based on information indicating the quality measured by said quality measuring unit and detecting deterioration information based on decision results on the presence or absence of said quality deterioration;
a call state detector for detecting the beginning and termination of communication of a radio communication terminal or a termination cause indicating whether or not termination has occurred due to a user's operation;
a termination cause decision unit for deciding a termination cause of communication detected by said call state detector in communication termination of said radio communication terminal and deciding whether or not said termination is a voluntary communication termination by a user due to communication quality deterioration, using deterioration information detected by said deterioration information detector when said termination has occurred due to a user's operation; and
a counter for counting the number of occurrences of voluntary communication termination by a user due to quality deterioration of communication based on decision results by said causal relation decision unit;
said radio network controller including:
a summation display unit for summarizing and displaying the number of occurrences of voluntary communication termination by user due to communication quality deterioration in each radio communication terminal counted by said radio base station controller.

13. The radio communication system defined in claim 12, wherein said radio base station controller comprises a communication destination detector that detects a communication destination identifier for identifying a communication opposite party of a radio communication terminal belonging to said radio base station to be controlled;
wherein said counter stores said communication destination identifier into a storage unit when decision indicates that termination of said radio communication terminal is communication termination by a user due to communication quality deterioration;
said counter deciding whether or not re-dialing has been performed to the same communication opposite party in the next communication of said radio communication terminal, based on a communication destination identifier in current communication and based on a communication destination identifier stored in previous communication, and counting the number of occurrences of re-dialing due to communication quality deterioration; and wherein said summation display unit summarizes and displays the number of occurrences of re-dialing due to communication quality deterioration of each radio communication terminal.

14. A radio communication terminal in a radio communication system, which is operated by a user, comprising:
a quality measuring unit for measuring a radio connection quality of said radio communication terminal during communication of said radio communication terminal;
a deterioration information detector for deciding the presence or absence of quality deterioration based on information indicating the quality measured by said quality measuring unit and detecting deterioration information based on decision results on the presence or absence of said quality deterioration;
a call state detector for detecting the beginning and termination of communication of a radio communication terminal or a termination cause indicating the presence or absence of termination caused by a user's operation;
a termination cause decision unit for deciding a termination cause of communication detected by said call state detector in communication termination and deciding whether or not termination is a voluntary communication termination by a user due to communication quality deterioration, using deterioration information detected by said deterioration information detector when termination has occurred due to a user's operation; and
a counter for counting the number of occurrences of voluntary communication termination by a user due to communication quality deterioration based on decision results by said causal relation decision unit.

15. The radio communication terminal defined in claim 14, further comprising a communication destination detector that detects a communication destination identifier for identifying a communication opposite party; and
wherein said counter stores said communication destination identifier into a storage unit when decision indicates that termination is voluntary communication termination by a user due to communication quality deterioration; and
said counter deciding whether or not re-dialing has been performed to the same communication opposite party in the next communication, based on a communication destination identifier in current communication and based on a communication destination identifier stored in the previous communication and counting the number of occurrences of re-dialing due to quality deterioration of communication.

16. A radio control base station for controlling a radio base station that establishes a bi-directional radio link to a radio communication terminal operated by a user in a radio communication system, said radio control base station comprising:
a call state detector for detecting the beginning and termination of communication of a radio communication terminal belonging to a radio base station to be controlled or a termination cause indicating whether or not termination has occurred a user's operation;
a quality measuring unit for measuring a radio connection quality in said radio communication terminal during communication of said radio communication terminal; a deterioration information detector for deciding the presence or absence of quality deterioration based on information indicating the quality measured by said quality measuring unit and detecting deterioration information based on decision results on the presence or absence of said quality deterioration;

a termination cause decision unit for deciding a termination of communication detected by said call state detector in communication termination of said radio communication terminal and deciding whether or not termination is voluntary communication termination by a user due to communication quality deterioration, using deterioration information detected by said deterioration information detector when termination has occurred due to a user's operation; and a counter for counting the number of occurrences of voluntary communication termination by a user due to communication quality deterioration based on decision results by said causal relation decision unit.

17. The radio control base station defined in claim 16, further comprising a communication destination detector that detects a communication destination identifier for identifying a communication opposite party of a radio communication terminal; and wherein said counter stores said communication destination identifier into a storage unit when decision indicates that termination of said radio communication terminal is a voluntary communication termination by a user due to communication quality deterioration; and said counter deciding whether or not re-dialing has been performed to the same communication opposite party in the next communication of said radio communication terminal, based on a communication destination identifier in the current communication and based on a communication destination identifier stored in the previous communication.

18. A radio network performance monitoring program suitably applied to a radio communication terminal operated by a user in a radio communication system, said program directing a computer to execute the steps of:

detecting the beginning and termination of communication and a termination cause indicating whether or not termination has occurred due to a user's operation;

measuring a radio connection quality during communication;

deciding the presence or absence of the quality deterioration based on information indicating a measured quality and detecting deterioration information based on the decision results on the presence or absence of said quality deterioration;

deciding said cause of termination in communication termination and deciding whether or not said termination is a voluntary communication termination by a user due to communication quality deterioration, using said deterioration information when said termination is caused by a user's operation; and counting the number of occurrences of termination performed voluntarily by a user due to communication quality deterioration.

19. The radio network performance monitoring program defined in claim 18, further executing a computer to execute the steps of:

storing said communication destination identifier into a storage unit when it is decided that termination has been performed voluntarily by a user due to communication quality deterioration; and deciding whether or not re-dialing has been performed to the same communication opposite party in the next communication, based on a communication destination identifier in the current communication and based on a communication destination identifier stored in the previous communication, and counting the number of occurrences of re-dialing due to communication quality deterioration.

20. A radio network performance monitoring program suitably applied to a radio base station controller that controls a radio base station establishing a bi-directional radio link to a radio communication terminal operated by a user in a radio communication system, said program directing a computer to execute the steps of:

detecting the beginning and termination of communication of a radio communication terminal belonging to a radio base station to be controlled or a termination cause indicating whether or not termination has caused by a user's operation;

measuring a radio connection quality of said radio communication terminal during communication of said radio communication terminal;

deciding the presence or absence of the quality deterioration based on information indicating quality and detecting deterioration information based on the decision results on the presence or absence of said quality deterioration;

deciding said cause of termination in communication termination of said radio communication terminal and deciding whether or not termination is a voluntary communication termination by a user due to communication quality deterioration, using said deterioration information when said termination has caused by a user's operation; and counting the number of occurrences of termination performed voluntarily by a user due to communication quality deterioration.

21. The radio'network performance monitoring program defined in claim 20, further directing a computer to execute the steps of:

storing said communication destination identifier into a storage unit when it is decided that termination of a radio communication terminal has been performed voluntarily by a user due to communication quality deterioration; and deciding whether or not re-dialing has been performed to the same communication opposite party in the next communication of said radio communication terminal, based on a communication destination identifier in the current communication and based on a communication destination identifier stored in the previous communication, and counting the number of occurrences of re-dialing due to communication quality deterioration.

* * * * *